William H. Abel's improvements in Weft Thread Knitting Looms. 105,539.

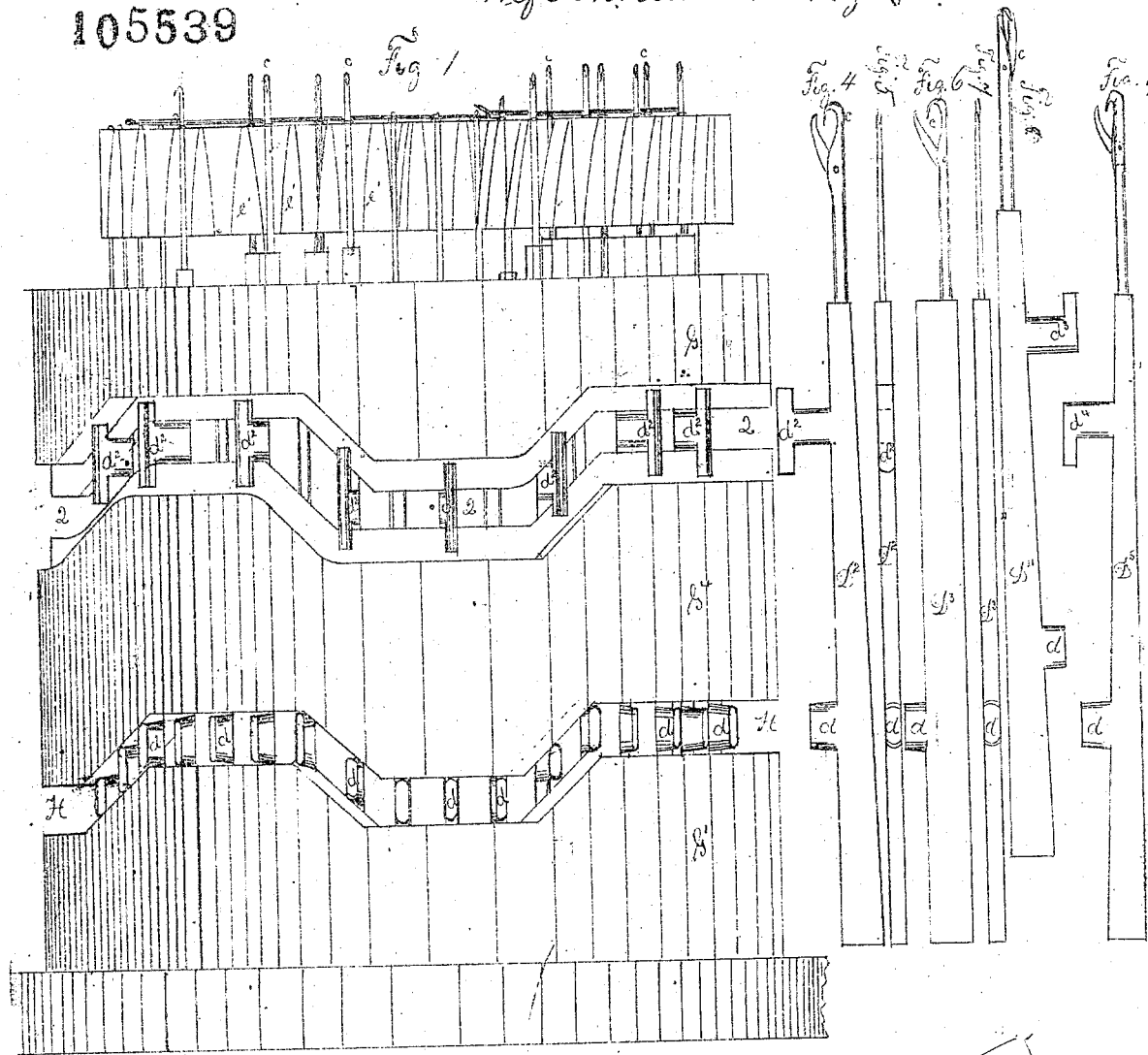
William H. Abel.
Improvements in Weft Thread Knitting Looms.
No. 105539. Patented Jul 19.

Witnesses
Wm P Brown
Nathan Brown

Inventor
William H Abel

105,539

UNITED STATES PATENT OFFICE.

WILLIAM H. ABEL, OF LOWELL, MASSACHUSETTS, ASSIGNOR TO HIMSELF, ROBERT H. BROWN, AND JOHN E. CRANE.

IMPROVEMENT IN KNITTING-MACHINES.

Specification forming part of Letters Patent No. 105,539, dated July 19, 1870.

*To all whom it may concern:*

Be it known that I, WILLIAM H. ABEL, of Bennington, in the county of Bennington and State of Vermont, at present residing in Lowell, in the county of Middlesex and State of Massachusetts, have invented certain new and useful Improvements in Weft-Thread Knitting-Looms, or in Knitting-Machines which introduce weft-thread between the loops or stitches, of which the following is a full, clear, and exact description, reference being had to the accompanying drawing making part of this specification, in which—

Figure 10:
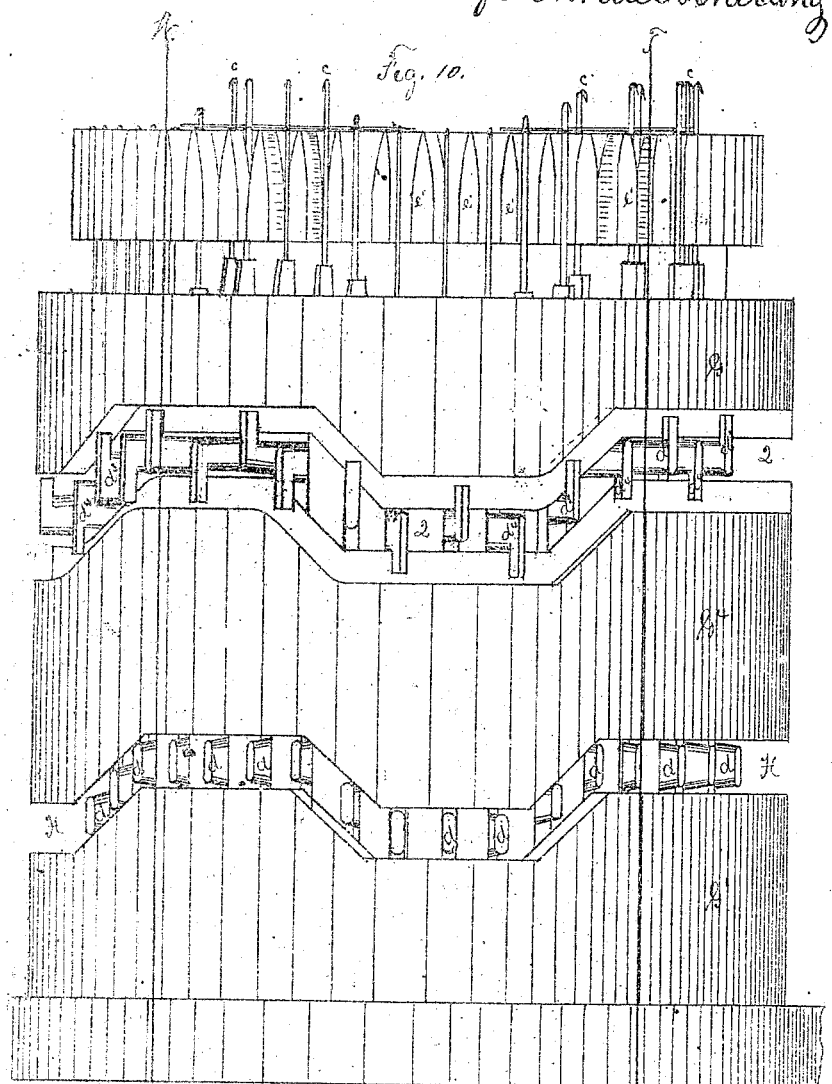
Figures 12, 13:
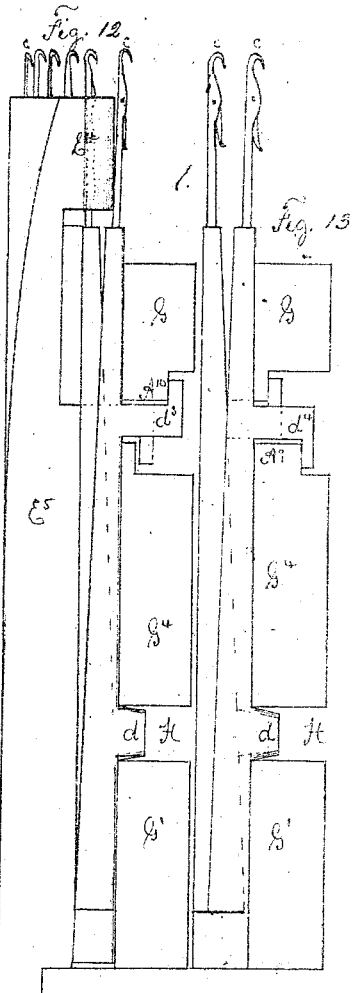
Figure 11:
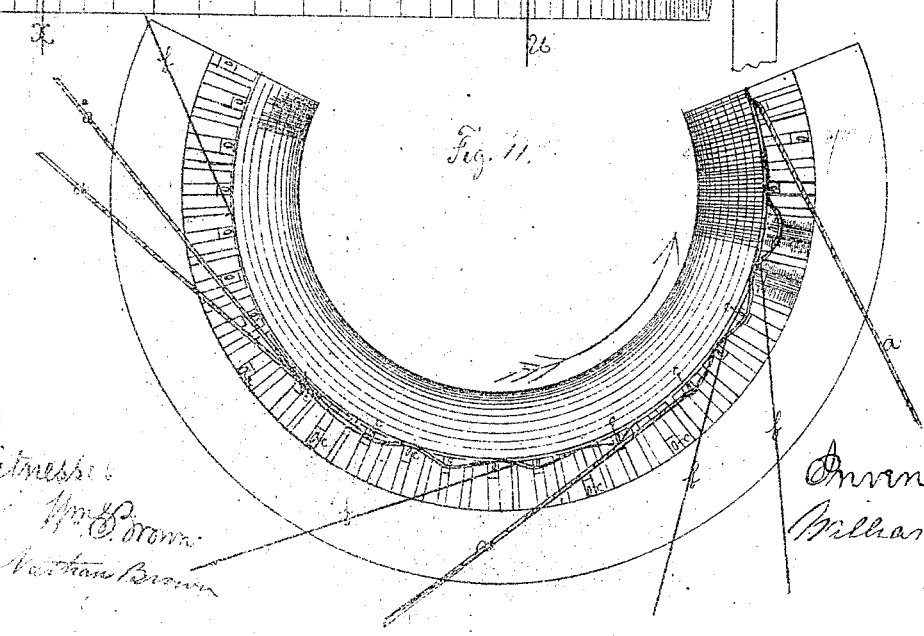

On said drawing, in Figures 1 to 13, inclusive, I have shown sections of an operating knitting-loom head with two circuitous cam-grooves in the outer cylinder and needle-slides, which are tapering and narrower at their top ends, and provided with hook-butts projecting upward, and others projecting downward, and others projecting both upward and downward, and also cams or cam-surfaces on the upper and lower edges of the upper cam-groove for actuating the slides by their said hook-butts. I have also shown one or more straight-sided needle-slides with parallel sides, and with only the lower butts $d$ for operating or reciprocating the slides, all of which are provided with the last-named butts. Figs. 4, 5, 6, 7, 8, and 9 represent side and edge views of different slides which I use in this kind of operating head, or in a head having a cam-cylinder, G, of this construction and arrangement of parts. The needles are intended to be the flattened or flat-wire needles, preferable by reason of their greater strength or rigidity in their edgewise direction. Fig. 10 represents a side elevation, like or similar to that shown in Fig. 1, but having different and appropriate slides, which are shown in Figs. 8 and 9. Fig. 11 represents a top view of a portion of the operating head, shown in Fig. 10 and also in Fig. 1. The warp or knitting thread-guides and the weft or filling thread-guides should be arranged to guide their threads directly to or between the needles when in the best position to receive them. Fig. 12 is a vertical section of Fig. 10 on the line T U; and Fig. 13 a similar section on the line W X thereof, except the inner cylinder, which, in Fig. 12, is marked $E^2$.

This invention consists of the needle-slides having hooked butts, constructed substantially as described, and operating in connection with cams on a cam-cylinder to divide the needles carried by the slides for the introduction of weft-thread; also, in the combination of the slides having plain and hooked butts, with cams acting in connection with such hook-butts to reciprocate and divide the needles carried by the slides, all substantially as described; also, the cam-cylinder, constructed as described.

In this invention the butts $d$, which operate the slides vertically or which reciprocate the slides, work in the lower cam-groove H, while the upper and hooked butts $d^2$, $d^3$, and $d^4$ work in the upper cam-groove Q. The actuating-cams $A^9$ and $A^{10}$ are shown in Figs. 2 and 3, also in Figs. 12 and 13, which are intended to represent sectional elevations of Fig. 10, the latter being substantially similar to the elevation shown in Fig. 1, except the upper butts $d^2$, which, in Fig. 1, are double-hook butts. The slides $D^2$, having double-hook T-shaped butts $d^2$, are intended to be used in connection with the plain slides $D^3$, shown in Fig. 6, or with these and the slides $D^4$ or $D^5$, seen in Figs. 8 and 9, or with some of each of the slides $D^4$ and $D^5$; the former, viz., $D^4$, having upward or L-shaped hooked butts $d^3$, and the latter, viz., $D^5$, having downward or F-shaped hooked butts $d^4$. The slides $D^2$ may be successfully used in connection with either or both of the slides $D^4$ and $D^5$, as described, and without the slides $D^3$; but the best results in forming weft-thread looped fabric are produced by the use of the two needle-slides having the F and L shaped hooked butts operating in connection, substantially in the manner shown in Figs. 10, 12, and 13, actuated by the actuating-cams $A^9$ and $A^{10}$, each of said cams being formed or applied at different points and on opposite sides of the groove Q—that is, one cam above and one cam below the groove—so that each cam shall actuate alternate slides or successive slides, or alternate slides at one or more points and successive slides at other points or parts of the series, thereby producing a very numerous and extensive variety of changes in the actuation of the slides and the needles, and consequent changes in the figures of the fabric.

In reference to Figs. 10 to 13, inclusive, I will here state that, in the use of the actuating-cams A⁹ and A¹⁰ and the F and L shaped butt-slides, I produce a peculiar actuating motion, and a change or changes in the actuating motion or in the actuation of the slides and the needles, which changes, &c., are as follows: When these slides are carried around by the rotating inner cylinder and are operated or raised and depressed by the lower butts d and d, operating in the lower cam-groove H, in passing the lower cam A⁹, only the lower hook or F-shaped butt-slides are actuated or moved outward; but when the slides are passing the upper cam A¹⁰, then the actuation is changed, and the upward or L-shaped butt-slides are actuated instead of the others.

In each case above described the cams A⁹ and A¹⁰ are so located that the needles in the slides will continue their rising motion after they are divided, and will be caused to commence their dividing motion before they are raised, and this produces a sufficient and suitable path or passage for the easy and certain introduction of the weft-thread between the divided needles, which continue their rising motion, or which rise at each side of the weft-thread, and inclose the latter between them as the F and L shaped butts leave the actuating-cams.

By the above-described arrangement and combination of F and L shaped butt-slides I produce the diamond-weave, and to produce the basket-weave I dispense with either the upper or the lower cams, remove the F or the L shaped butts from their slides, or substitute a plain slide having no upper or actuating butt for either of the slides D⁴ or D⁵. The F and L shaped butt-slides are also intended for producing or forming a stripe or stripes in the fabric made for pants or pantaloon stuff, where side stripes of a different figure from the body of the fabric are required. Such stripes are produced by placing two or more of the F and L shaped butt-slides together or next to each other in the series. Fabric consisting of alternate equal or unequal stripes may be formed or produced by alternate sections of the F and L shaped butt-slides, and of the T-shaped butt and plain slides, in numbers proportionate to the width of the stripe or stripes to be formed, each alternate stripe of the diamond-weave, and the others of the basket-weave. The cylinder or loom head and the slides last above described I consider the best adapted for knitting, or for forming weft-thread looped fabrics, such as herein described, being more simple, cheaper, quite as efficient as any other, contributing to the production of the desired result by the simultaneous or successive action or operation of parts, which may be used separately or together, as shown and described.

One or more warp or looping threads, b, and weft-threads, a, may be knitted into the fabric at each point of forming and drawing over loops and at each point of introducing weft-thread, substantially as shown in Fig. 11, and at various points around the cylinder of slides and needles. A cylinder of such slides and needles, of eighteen inches in diameter, takes twenty-four feeds, twelve feeds of the looping or warp threads and twelve feeds of the weft-threads. It is intended that the construction of outer or cam cylinders G, G¹, and G⁴, shall render them readily applicable to the inner grooved cylinder of any common circular knitting-machine of the same diameter, and effective thereon for operating and actuating appropriate slides and their needles, so as to divide the needles and to introduce weft-thread between them, as described. The principal change required, in order to substitute this cam-cylinder for the cam-cylinder shown and described in my former application, filed October 8, 1869, is the removal of the cam-cylinder, the dividing-wheels, the presser-wheels, and the parts which connect them with the machine, although the presser-wheels may be employed with any of the dividing devices used in this machine, and substantially as employed on the machine shown and described in said former application. In the use of the needle-dividing devices herein described the needles continue their rising motion after being divided, and commence their dividing motion before being raised.

By the use of this, my said invention and improvements, I am enabled to produce warp and weft looped fabric of superior quality, cheaply and rapidly, and in a great variety of figures.

What I claim, and desire to secure by Letters Patent, is—

1. The needle-slides having hooked butts, constructed substantially as described, and operating, in connection with cams on a cam-cylinder, to divide the needles carried by the slides for the introduction of weft-thread.

2. The combination of the slides having plain and hooked butts with cams acting in connection with such butts to reciprocate and divide the needles carried by the slides, all substantially as described.

3. The cam-cylinder herein described, provided with cam-grooves H and Q, the former engaging plain butts to reciprocate the n__dles, and the latter engaging hooked butt_ to divide the needles for the introduction of weft-threads.

WILLIAM H. ABEL.

Witnesses:
SQUIRE L. BAILEY,
A. A. HART.